United States Patent
Kitagawa (10) Patent No.: US 12,275,147 B2
(45) Date of Patent: Apr. 15, 2025

(54) ROBOT TEACHING SYSTEM

(71) Applicant: DAIHEN Corporation, Osaka (JP)

(72) Inventor: Ryo Kitagawa, Osaka (JP)

(73) Assignee: DAIHEN Corporation, Osaka (JP)

( * ) Notice: Subject to any disclaimer, the term of this patent is extended or adjusted under 35 U.S.C. 154(b) by 302 days.

(21) Appl. No.: 17/901,421

(22) Filed: Sep. 1, 2022

(65) Prior Publication Data

US 2023/0249340 A1  Aug. 10, 2023

(30) Foreign Application Priority Data

Feb. 8, 2022 (JP) ................................ 2022-018068

(51) Int. Cl.
*B25J 9/16* (2006.01)

(52) U.S. Cl.
CPC .................... *B25J 9/163* (2013.01)

(58) Field of Classification Search
CPC ........ B25J 9/163; B25J 9/1671; B25J 9/0081; B25J 13/088; G05B 2219/35336; G05B 2219/36154; G05B 2219/36331; G05B 2219/39444; Y02P 90/02
See application file for complete search history.

(56) References Cited

U.S. PATENT DOCUMENTS

2015/0379171 A1  12/2015  Kuwahara

FOREIGN PATENT DOCUMENTS

| EP | 4079465 A1 | | 10/2022 |
|----|-----------|---|---------|
| JP | 2016-013579 A | | 1/2016 |
| JP | 2021-011017 A | | 2/2021 |
| JP | 2021-94644 A | | 6/2021 |
| KR | 20140104914 A | * | 8/2014 |

OTHER PUBLICATIONS

English Language Machine Translation of JP 2021-011017A, published Feb. 4, 2021.

* cited by examiner

*Primary Examiner* — Michael C Zarroli
(74) *Attorney, Agent, or Firm* — Sterne, Kessler, Goldstein & Fox P.L.L.C.

(57) ABSTRACT

A robot teaching system includes: a robot position and attitude calculation unit that calculates positions and attitudes of a robot corresponding to respective teaching instructions and points between the respective teaching instructions included in a working program for operating the robot; an imaginary robot information generation unit that generates imaginary robot information corresponding to the respective teaching instructions and the points between the respective teaching instructions on a basis of the positions and attitudes of the robot; a teaching instruction selection unit that selects at least one of the respective teaching instructions included in the working program; and a display unit that displays the imaginary robot information on a basis of the selected teaching instruction. The robot teaching system is able to easily confirm the position and attitude of the robot in an arbitrary teaching instruction of the working program.

8 Claims, 7 Drawing Sheets

ROBOT TEACHING SYSTEM

BACKGROUND

Field

The present invention relates to a robot teaching system.

Description of Related Art

In recent years, many robots have become prevalent in industrial fields. The robots are used in, for example, assembling of electronic components and machine components, welding, transportation, or the like, making production lines of factories more efficient and automatized. A working program for causing such robots to perform a desired operation is needed to be generated and stored in advance as so-called teaching data. In order to generate the working program (teaching data), an operator operates an actual robot using a teaching pendant to record the operation or performs a simulation in a simulator environment without operating the actual robot.

In the simulator environment, a pseudo robot that is taken into a simulator is operated in an imaginary space, and the position and attitude of the pseudo robot are displayed.

Moreover, Patent Publication JP-A-2021-11017 discloses a technology relating to a robot display system for causing an operator to recognize the operation of a robot. In the robot display system, an imaginary image, including an image showing the operation track of a robot and an image showing an expected track, is displayed so as to overlap the robot.

SUMMARY

In the robot display system disclosed in Patent Publication JP-A-2021-11017, the operation track of the robot corresponding to a working program is displayed, but the position and attitude of the robot that operates in accordance with the working program are not displayed. Further, even if a pseudo robot taken into a simulator is operated in an imaginary space, it is not possible to easily ascertain the positions and attitudes of the robot corresponding to respective teaching instructions and points between the respective teaching instructions included in the working program.

In view of this, the present invention has an object of providing a robot teaching system able to easily confirm, for the position and attitude of a robot that operates in accordance with a working program, the position and attitude of the robot in an arbitrary teaching instruction of the working program.

An aspect of the present invention provides a robot teaching system including: a robot position and attitude calculation unit that calculates positions and attitudes of a robot corresponding to respective teaching instructions and points between the respective teaching instructions included in a working program for operating the robot; an imaginary robot information generation unit that generates imaginary robot information corresponding to the respective teaching instructions and the points between the respective teaching instructions on a basis of the positions and attitudes of the robot; a teaching instruction selection unit that selects at least one of the respective teaching instructions included in the working program; and a display unit that displays the imaginary robot information on a basis of the selected teaching instruction.

According to the aspect, the robot position and attitude calculation unit calculates positions and attitudes of a robot corresponding to respective teaching instructions and points between the respective teaching instructions included in a working program, and the imaginary robot information generation unit generates imaginary robot information corresponding to the respective teaching instructions and the points between the respective teaching instructions on a basis of the positions and attitudes of the robot. Further, the teaching instruction selection unit selects at least one of the respective teaching instructions, and the display unit displays the imaginary robot information on a basis of the selected teaching instruction. Thus, it is possible to easily confirm the positions and attitudes of a robot based on respective teaching instructions included in a working program.

In the above aspect, the display unit may change a display mode of the imaginary robot information in accordance with the number of the selected teaching instructions.

According to the aspect, one or a plurality of teaching instructions are, for example, selected by a user, and the display unit changes a display mode of imaginary robot information in accordance with the selected teaching instruction(s). As a result, the user is allowed to easily confirm the positions and attitudes of a robot in a display mode corresponding to the number of teaching instructions selected by the user himself/herself.

In the above aspect, the display unit may display the imaginary robot information as a still image when one teaching instruction is selected by the teaching instruction selection unit.

According to the aspect, the display unit displays imaginary robot information as a still image when one teaching instruction is selected by the teaching instruction selection unit. Therefore, the user is allowed to appropriately confirm the position and attitude of a robot corresponding to one teaching instruction as a still image.

In the above aspect, the display unit may display the imaginary robot information as an animation in intervals specified by a plurality of selected teaching instructions when the plurality of teaching instructions are selected by the teaching instruction selection unit.

According to the aspect, the display unit displays imaginary robot information as an animation when a plurality of teaching instruction are selected by the teaching instruction selection unit. Therefore, the user is allowed to appropriately confirm the positions and attitudes including movement of a robot corresponding to teaching instructions in intervals specified by the user himself/herself.

In the above aspect, the robot teaching system may further include an input position recognition unit that recognizes a position of input by a user in an operating area relating to a teaching instruction selected by the teaching instruction selection unit, and the display unit may display the imaginary robot information corresponding to the position of input recognized by the input position recognition unit.

According to the aspect, the input position recognition unit recognizes an input position by the user in an operating area, and the display unit displays imaginary robot information corresponding to the input position recognized by the input position recognition unit. Therefore, the user is allowed to easily confirm the position and attitude of a robot at a position in accordance with, for example, a swipe operation in an operating area.

According to the present invention, it is possible to provide a robot teaching system able to easily confirm, for the position and attitude of a robot that operates in accordance with a working program, the position and attitude of the robot in an arbitrary teaching instruction of the working program.

DETAILED DESCRIPTION

Hereinafter, an embodiment of the present invention will be specifically described with reference to the accompanying drawings. Note that the following embodiment only shows a specific example for carrying out the present invention and does not intend to interpret the present invention in a limited way. Further, in order to facilitate the understanding of the description, the same constituting elements are denoted by the same symbols as much as possible in the respective drawings, and duplicated descriptions may be omitted or simplified in some cases.

Embodiment

Basic Configuration of Welding Robot System

Figure 1:
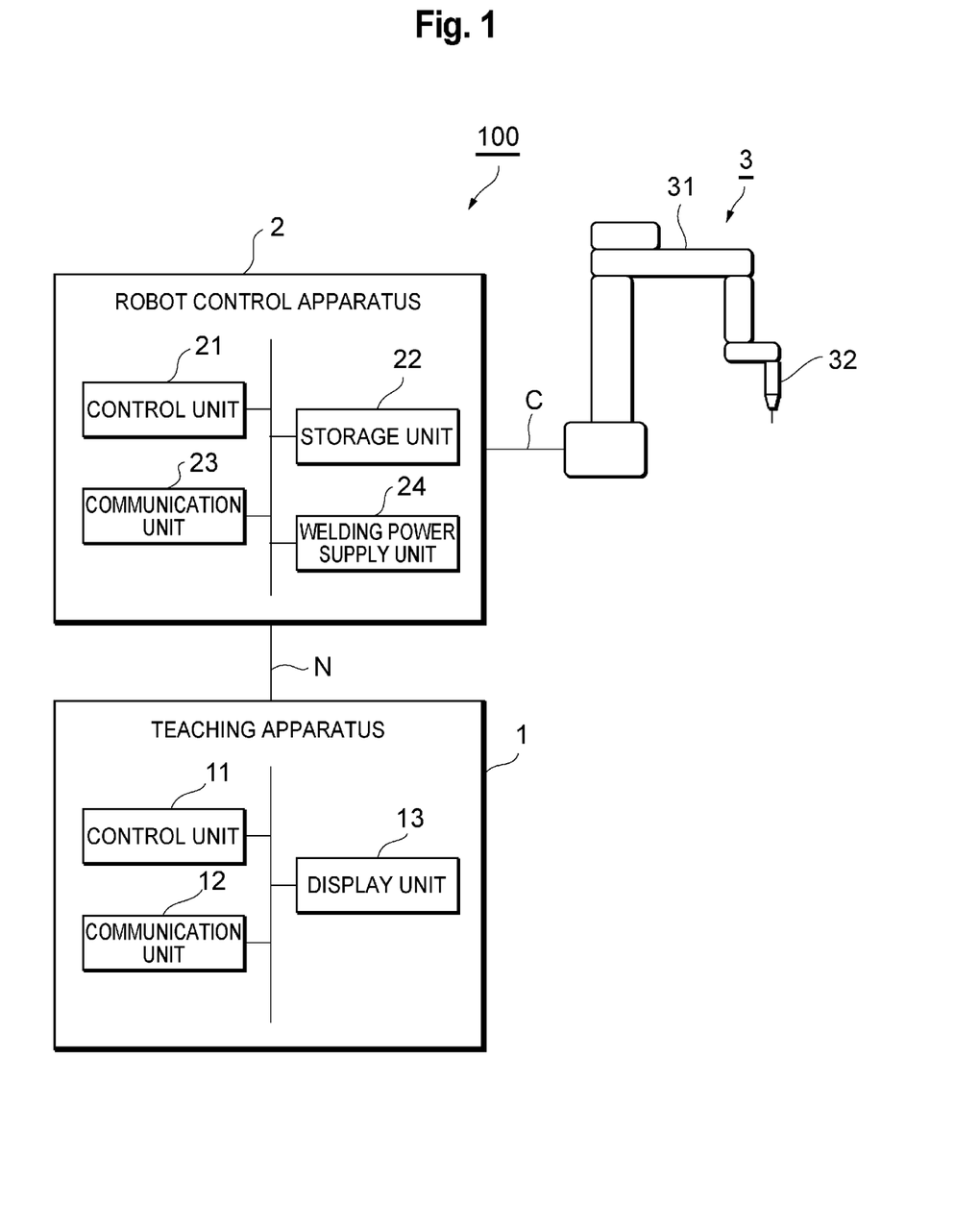
FIG. 1 is a diagram exemplifying the configuration of a welding robot system 100 including a robot teaching system according to an embodiment of the present invention.

FIG. 1 is a diagram exemplifying the configuration of a welding robot system 100 including a robot teaching system according to an embodiment of the present invention. As shown in FIG. 1, the welding robot system 100 includes, for example, a teaching apparatus 1, a robot control apparatus 2, and a manipulator 3. The teaching apparatus 1 and the robot control apparatus 2 are connected to each other via, for example, a network N, and the robot control apparatus 2 and the manipulator 3 are connected to each other via, for example, a communication cable C. The network N may be a wired network (including a communication cable) or a wireless network. Note that the welding robot system 100 may include a teaching pendant. The teaching pendant is an operating apparatus with which an operator teaches the operation of the manipulator 3.

The manipulator 3 is a welding robot (industrial robot) that performs arc welding according to construction conditions set in the robot control apparatus 2. The manipulator 3 has, for example, an articulated arm 31 provided on a base member fixed to a floor or the like of a factory and a welding torch 32 (end effector) connected to the tip end of the articulated arm 31.

The robot control apparatus 2 is a control unit that controls the operation of the manipulator 3 and includes, for example, a control unit 21, a storage unit 22, a communication unit 23, and a welding power supply unit 24.

The control unit 21 runs, for example, a working program stored in the storage unit 22 with a processor to control the manipulator 3 and the welding power supply unit 24.

The communication unit 23 controls communication with the teaching apparatus 1 connected via the network N or communication with the manipulator 3 connected via the communication cable C.

The welding power supply unit 24 supplies, in order to, for example, generate an arc between the tip end of a welding wire and a workpiece, a welding current, a welding voltage, or the like to the manipulator 3 according to previously-set welding construction conditions. The welding construction conditions include, for example, data items such as a welding condition, a welding start position, a welding end position, an arc discharge time, a welding distance, and the attitude and movement speed of a welding torch. The welding power supply unit 24 may be provided separately from the robot control apparatus 2.

The teaching apparatus 1 displays imaginary robot information that will be described later. For example, the teaching apparatus 1 may be a stationary liquid crystal display or organic EL display, or may be a portable terminal including a liquid crystal display or an organic EL display. The portable terminal includes, for example, a portable terminal such as a tablet terminal, a smart phone, a mobile information terminal (PDA), and a notebook PC (personal computer). Further, the portable terminal may be a teaching pendant described above including a display unit.

Moreover, the teaching apparatus 1 may display a working program run by the robot control apparatus 2.

The teaching apparatus 1 includes, for example, a control unit 11, a communication unit 12, and a display unit 13.

The control unit 11 runs a prescribed program stored in a memory with a processor to control the respective units of the teaching apparatus 1 including the communication unit 12 and the display unit 13.

The communication unit 12 controls communication with the robot control apparatus 2 connected via the network N.

As described above, the display unit 13 displays, for example, imaginary robot information and a working program. Further, the display unit 13 may be, for example, operable with respect to displayed imaginary robot information and a working program as a display apparatus having a touch panel, and the teaching apparatus 1 may include an operating unit for operating imaginary robot information and a working program displayed on the display unit 13.

Configuration of Robot Teaching System

Figure 2:
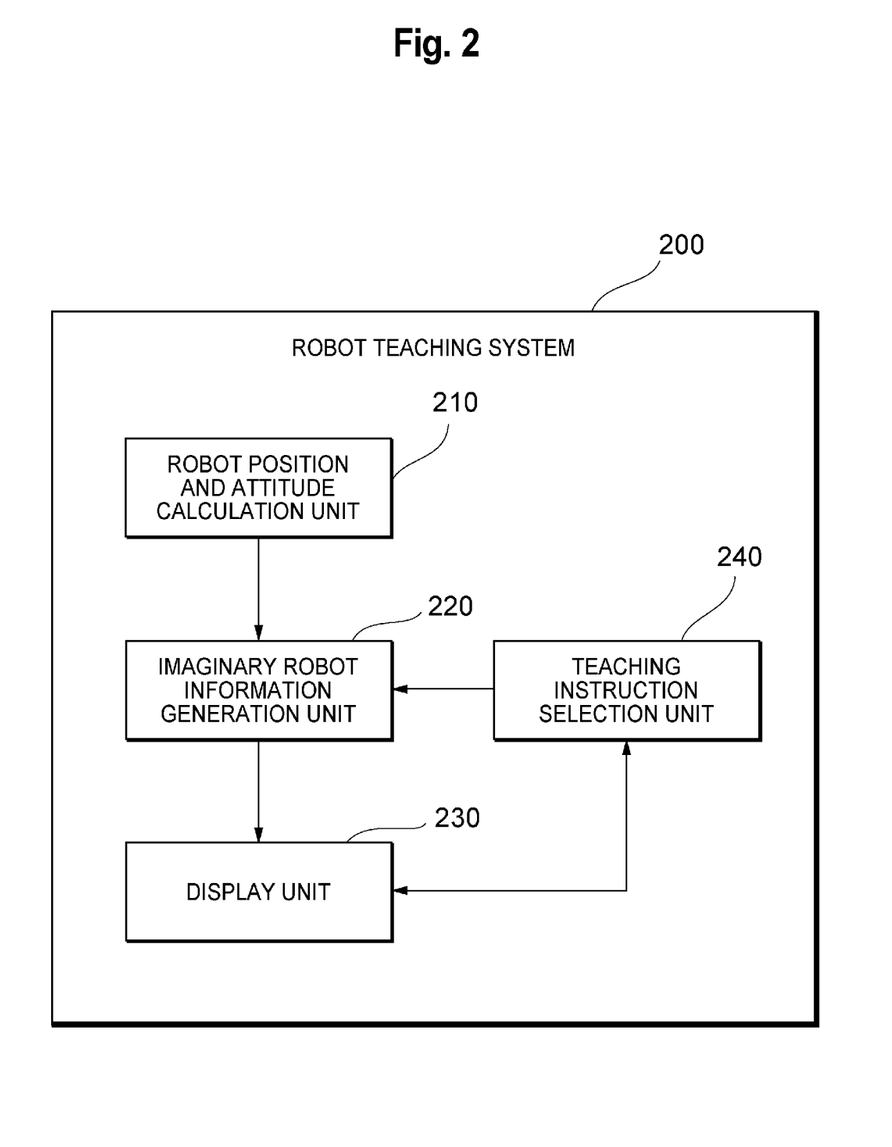
FIG. 2 is a diagram exemplifying the functional configuration of a robot teaching system 200 according to an embodiment of the present invention.

FIG. 2 is a diagram exemplifying the functional configuration of a robot teaching system 200 according to an embodiment of the present invention. As shown in FIG. 2, the robot teaching system 200 includes, for example, a robot position and attitude calculation unit 210, an imaginary robot information generation unit 220, a display unit 230, and a teaching instruction selection unit 240 as the functional configuration.

Among these functions, the display unit 230 and the teaching instruction selection unit 240 are functions provided in the teaching apparatus 1. On the other hand, both the robot position and attitude calculation unit 210 and the imaginary robot information generation unit 220 may be provided in any of the teaching apparatus 1 and the robot control apparatus 2, or the respective functions of the robot position and attitude calculation unit 210 and the imaginary robot information generation unit 220 may be dispersively provided in the teaching apparatus 1 and the robot control apparatus 2. Further, apparatuses other than the teaching apparatus 1 and the robot control apparatus 2 may include a part or all of the above functions.

The robot position and attitude calculation unit 210 calculates the positions and attitudes of a robot corresponding to respective teaching instructions and points between the respective teaching instructions included in a working program for operating the robot. For example, the robot position and attitude calculation unit 210 calculates the positions and attitudes of a robot corresponding to respective teaching instructions included in a working program. Specifically, the robot position and attitude calculation unit 210 is only required to calculate, on the basis of information including a start position, an end position, a welding target position, a welding torch (tool) type, a welding wire type, and a protruding length, or the like in respective teaching instructions, the positions and rotation angles of the respective shafts of the manipulator 3 in consideration of the positions of the articulated arm 31 and the welding torch 32 of the manipulator 3.

Note that teaching instructions generally refer to movement instructions accompanying the movement of a robot and application instructions that do not include the direct movement of the robot such as the output of a signal to peripheral equipment of the robot and the designation of a welding interval. The teaching instructions in the present embodiment basically refer to movement instructions.

Moreover, the robot position and attitude calculation unit 210 calculates the positions and attitudes of a robot corresponding to points between respective teaching instructions included in a working program for operating the robot. Specifically, the robot position and attitude calculation unit 210 is only required to calculate, on the basis of information (interpolation point information) including a movement speed, an interpolation type, interpolation accuracy, or the like besides information in respective teaching instructions described above, the positions and rotation angles of the respective shafts of the manipulator 3 in consideration of the positions of the articulated arm 31 and the welding torch 32 of the manipulator 3 corresponding to points between respective teaching instructions. Note that the interpolation type refers to settings as to how a robot is operated and moved between respective points (teaching points), and includes, for example, joint interpolation, linear interpolation, arc interpolation, free curve interpolation, or the like.

The imaginary robot information generation unit 220 generates, on the basis of the positions and attitudes of a robot calculated by the robot position and attitude calculation unit 210, imaginary robot information corresponding to respective teaching instructions and points between the respective teaching instructions. For example, the imaginary robot information generation unit 220 generates, on the basis of the positions and rotation angles of the respective shafts of the manipulator 3 calculated by the robot position and attitude calculation unit 210, imaginary robot information corresponding to respective teaching instructions and points between the respective teaching instructions. Specifically, the imaginary robot information includes a still image of a robot showing the position and attitude of the robot and an animation (moving image) including the movement of the robot.

Specifically, an image of a robot to be operated is stored in advance in a storage unit such as a memory. The image of the robot may be, for example, an image acquired by actually photographing the robot using a camera or the like, or may be prepared in advance as an image showing the same type of a robot. The imaginary robot information generation unit 220 generates, on the basis of the positions and rotation angles of the respective shafts of the manipulator 3 calculated by the robot position and attitude calculation unit 210, imaginary robot information corresponding to respective teaching instructions and points between the respective teaching instructions from an image of the robot stored in the storage unit as described above. Here, the imaginary robot information generation unit 220 is only required to generate the respective imaginary robot information using, for example, CG (Computer Graphics), or the like.

The display unit 230 displays at least one imaginary robot information among imaginary robot information generated by the imaginary robot information generation unit 220. For example, the display unit 230 displays imaginary robot information corresponding to any of teaching instructions or arbitrary points including prescribed points between the respective teaching instructions among the respective teaching instructions and the points between the respective teaching instructions included in a working program. The imaginary robot information displayed on the display unit 230 may be one imaginary robot information at an arbitrary point, or may be a plurality of imaginary robot information corresponding to the whole or a part of the elapse of a working program.

Note that the imaginary robot information may be a still image at an arbitrary point, or may be an animation image (moving image) having continuity according to the elapse of a working program.

The teaching instruction selection unit 240 selects at least any of teaching instructions within the elapse of a working program. For example, the teaching instruction selection unit 240 may cause a user to select respective teaching instructions and arbitrary points between respective teaching instructions included in a working program displayed on the display unit 230.

Specific Example in Which Imaginary Robot Information is Displayed

Moreover, a state in which imaginary robot information is displayed by the robot teaching system 200 will be described in detail using a specific example.

Figure 3:
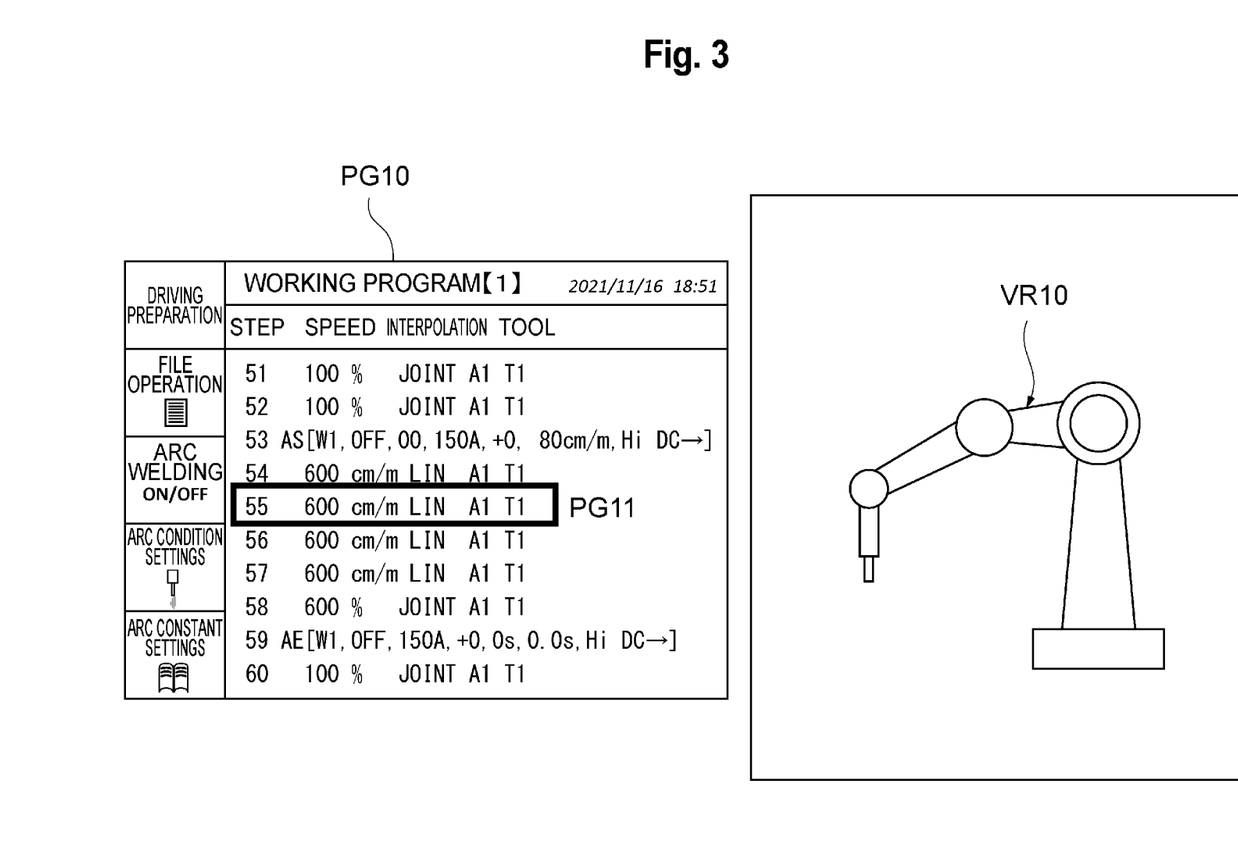
FIG. 3 is a diagram showing a specific example in which a working program for operating a robot and imaginary robot information corresponding to a teaching instruction included in the working program are displayed.

FIG. 3 is a diagram showing a specific example in which a working program for operating a robot and imaginary robot information corresponding to a teaching instruction included in the working program are displayed. As shown in FIG. 3, a working program PG10 for operating the manipulator 3 (robot) and imaginary robot information VR10 showing the position and attitude of the manipulator 3 (robot) are displayed.

Specifically, a teaching instruction PG11 showing step [55] is selected by a user from the working program PG10 displayed on a display screen by the display unit 230. Thus, the imaginary robot information VR10 corresponding to the teaching instruction PG11 is displayed. For example, the imaginary robot information VR10 is displayed as a still image.

Note that the teaching instruction PG11 showing the step [55] is selected by the user here but a teaching instruction showing another step may be selected from the working program PG10. Imaginary robot information corresponding to the selected teaching instruction is displayed.

As described above, imaginary robot information corresponding to a teaching instruction showing a step selected by the user from the working program PG10 is displayed. Therefore, the user is allowed to easily confirm the position and attitude of the manipulator 3 corresponding to a desired arbitrary point (teaching instruction).

Figure 4:
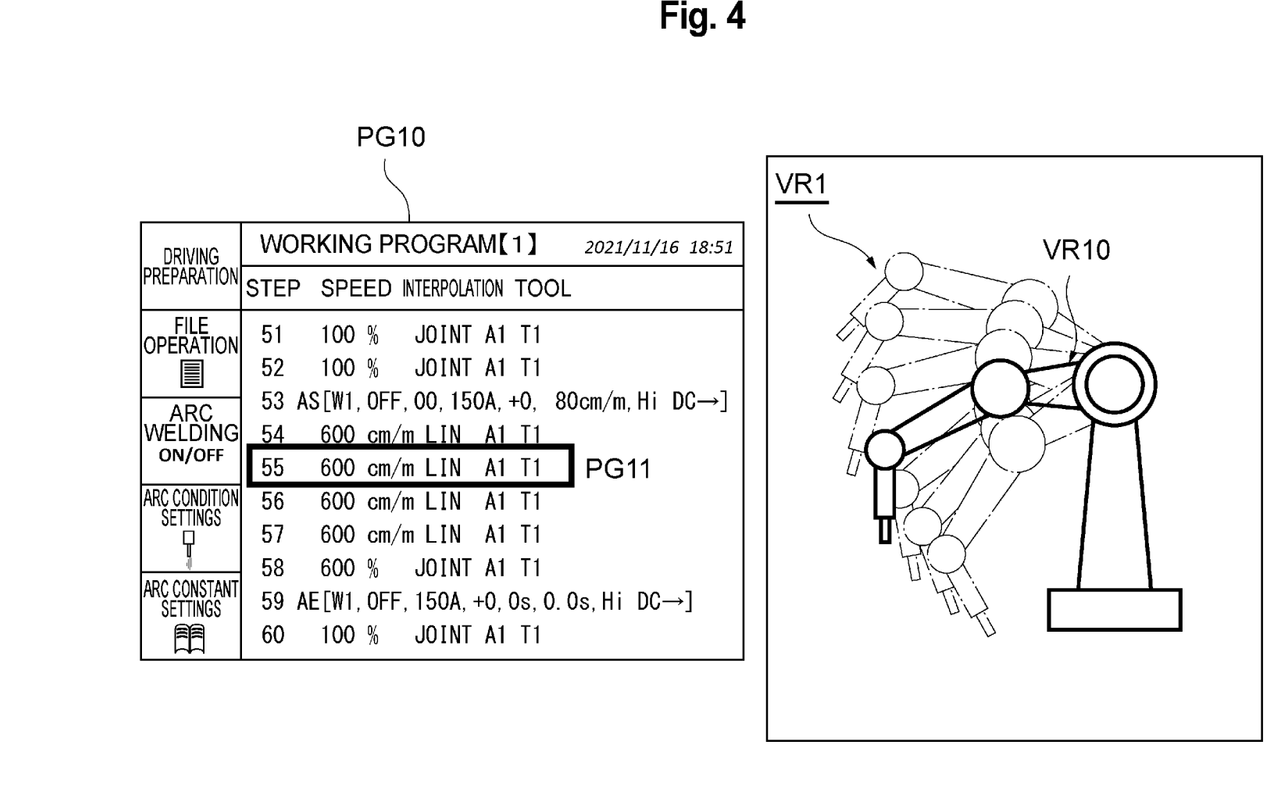
FIG. 4 is a diagram showing another specific example in which a working program for operating a robot and imaginary robot information corresponding to a teaching instruction included in the working program are displayed.

FIG. 4 is a diagram showing another specific example in which a working program for operating a robot and imaginary robot information corresponding to a teaching instruction included in the working program are displayed. As shown in FIG. 4, a working program PG10 for operating the manipulator 3 (robot) and a plurality of imaginary robot information VR1 showing the positions/attitudes of the manipulator 3 (robot) are displayed.

Specifically, the whole or a part of the imaginary robot information VR1 corresponding to respective steps [51] to [60] included in the working program PG10 is displayed. A teaching instruction PG11 showing the step [55] among the steps is selected by the user. Therefore, imaginary robot information VR10 corresponding to the teaching instruction PG11 is displayed in a mode different from those of other imaginary robot information.

For example, using a thick line (a thin line), a solid line (a dashed line, a broken line), a dense color (a pale color), a different color, a lighting display, a flashing display, or the like, the imaginary robot information VR10 among the plurality of imaginary robot information VR1 may be displayed in a different mode by being highlighted compared with other imaginary robot information.

Note that the whole or a part of the imaginary robot information VR1 corresponding to the respective steps [51] to [60] included in the working program PG10 is displayed here but the imaginary robot information VR1 with, for example, the first and last steps, steps before and after a teaching instruction selected by the user, and other steps among the respective steps [51] to [60] thinned may be displayed.

As described above, imaginary robot information corresponding to a teaching instruction showing a step selected by the user from the working program PG10 is displayed in a mode different from those of other imaginary robot information. Therefore, the user is allowed to easily confirm the position and attitude of the manipulator 3 corresponding to a desired arbitrary point (teaching instruction) in comparison with the positions/attitudes of the manipulator 3 corresponding to other points.

Figure 5:
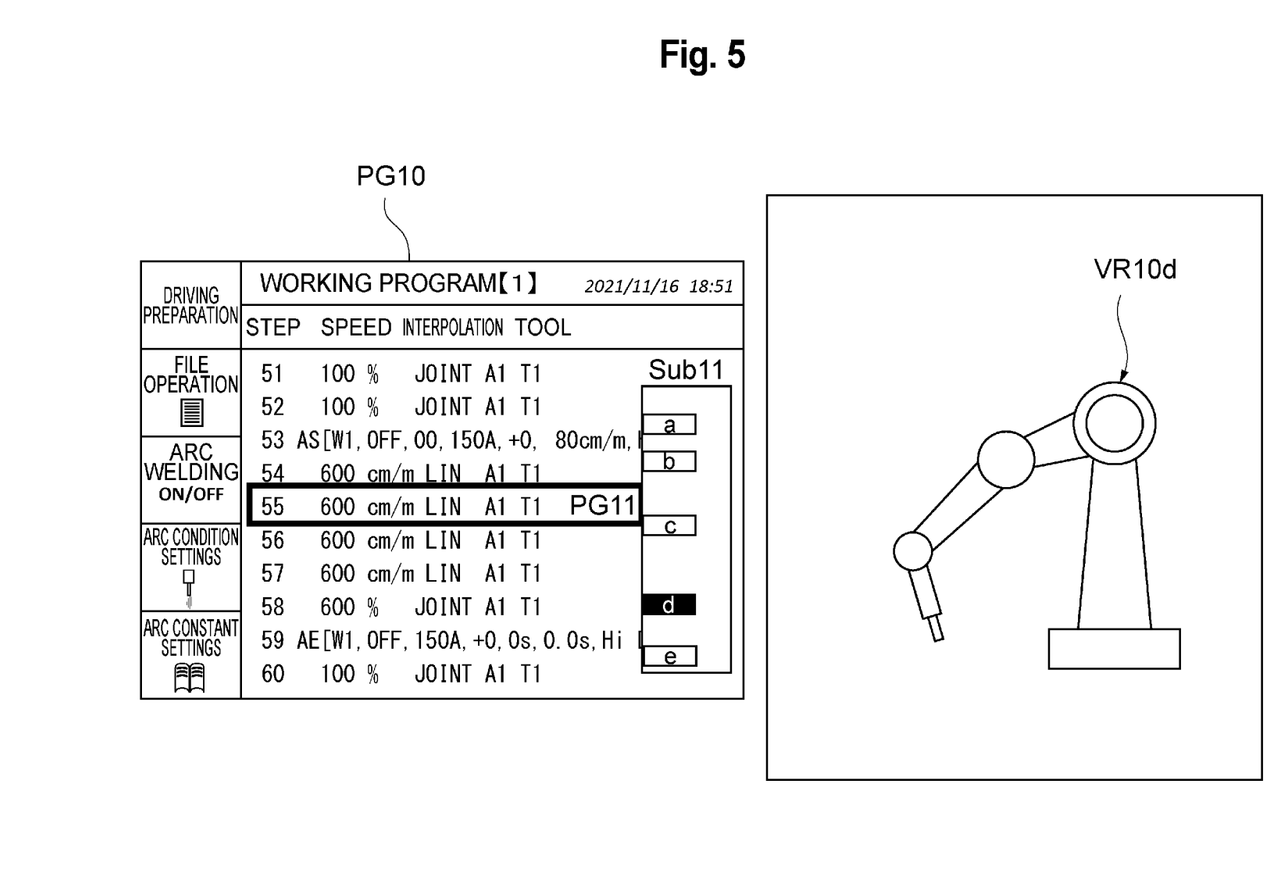
FIG. 5 is a diagram showing a specific example in which a working program for operating a robot and imaginary robot information corresponding to points between teaching instructions included in the working program are displayed.

FIG. 5 is a diagram showing a specific example in which a working program for operating a robot and imaginary robot information corresponding to a point between teaching instructions included in the working program are displayed. As shown in FIG. 5, a working program PG10 for operating the manipulator 3 (robot) and imaginary robot information VR10d showing the position and attitude of the manipulator 3 (robot) are displayed.

More specifically, details Sub11 showing the elapse of a teaching instruction PG11 are displayed as for the teaching instruction PG11 showing step [55] in the working program PG10. The details Sub11 show points between the selected step [55] and steps [54] and [56] before and after the step [55]. Specifically, the upper end of the details Sub11 shows the start point of the step [55] immediately after the end of the step [54], and the lower end of the details Sub11 shows the end point of the step [55] and shows the point immediately before the start of the step [56]. Here, the elapse of the step [55] in the working program PG10 has a plurality of points (a) to (e).

The teaching instruction selection unit 240 is able to select the plurality of points (a) to (e). For example, when the point (d) is selected by the user, the imaginary robot information VR10d corresponding to the point (d) between the steps [55] and [56] is displayed in the step [55]. Here, the imaginary robot information VR10d is displayed as a still image.

As described above, imaginary robot information corresponding to a prescribed point between adjacent teaching instructions selected by the user from the working program PG10 is displayed. Therefore, the user is allowed to easily confirm not only the position and attitude of the manipulator 3 corresponding to a teaching instruction but also the position and attitude of the manipulator 3 corresponding to a prescribed point between teaching instructions.

Note that the plurality of points (a) to (e) displayed in the details Sub11 are selectable, and imaginary robot information corresponding to a selected point is displayed here. However, using the details Sub11 as an operating area by the user, a point may be moved in accordance with a swipe operation by the user between the step [55] and the steps [54] and [56] before and after the step [55] to display imaginary robot information corresponding to the point. The robot teaching system 200 is only required to include an input position recognition unit that recognizes an input position by the user in the operating area shown by the details Sub11, and the display unit 230 is only required to display imaginary robot information corresponding to an input position recognized by the input position recognition unit.

Moreover, if respective teaching instructions included in the working program PG10 and imaginary robot information corresponding to a teaching instruction selected by the user are displayed on the same screen or preferably displayed so as to be adjacent to each other, the user is allowed to easily confirm imaginary robot information corresponding to respective points while performing an operation such as a swipe operation with the details Sub11 as the operating area by the user.

Further, the operating area in which the user is allowed to perform a swipe operation is not limited to the details Sub11. For example, the user may perform a swipe operation so as to trace a screen on which the respective steps of the working program PG10 are displayed. In this case, imaginary robot information corresponding to respective steps traced by the user is displayed.

Figure 6:
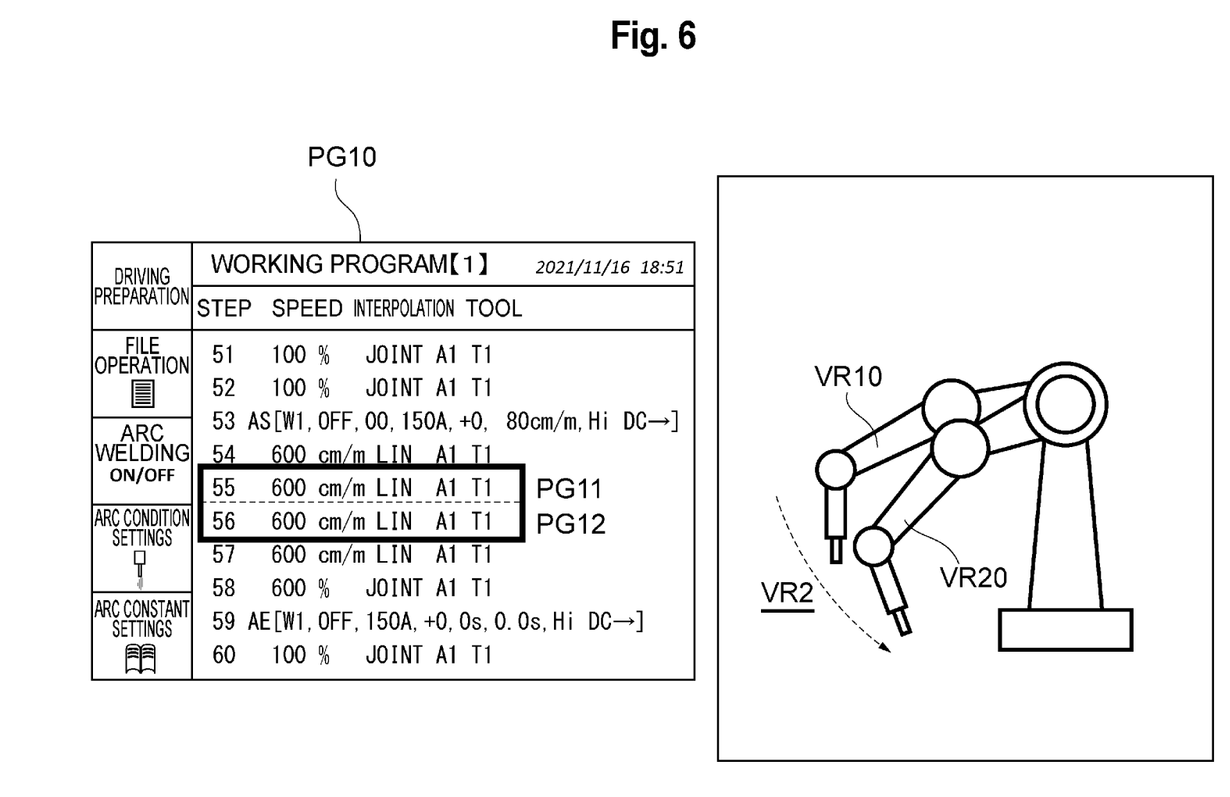
FIG. 6 is a diagram showing a specific example in which a working program for operating a robot and imaginary robot information corresponding to a plurality of teaching instructions included in the working program are displayed.

FIG. 6 is a diagram showing a specific example in which a working program for operating a robot and imaginary robot information corresponding to a plurality of teaching instructions included in the working program are displayed. As shown in FIG. 6, a working program PG10 for operating the manipulator 3 (robot) and imaginary robot information VR2 showing the positions and attitudes of the manipulator 3 (robot) are displayed. Note that the imaginary robot information VR2 is an animation image having continuity.

Specifically, a teaching instruction PG11 showing step [55] and a teaching instruction PG12 showing step [56] in the working program PG10 displayed on the display unit 230 are selected by the user. Thus, on the basis of imaginary robot information VR10 corresponding to the teaching instruction PG11, imaginary robot information VR20 corresponding to the teaching instruction PG12, and imaginary information corresponding to a point between the teaching instructions PG11 and PG12, the animation image VR2 having continuity is displayed.

Note that the imaginary robot information corresponding to the point between the teaching instructions PG11 and PG12 is not limited to one information but a plurality of imaginary robot information may be generated by the robot position and attitude calculation unit 210 and the imaginary robot information generation unit 220 to be used.

As described above, a plurality of teaching instructions (adjacent teaching instructions) in the working program PG10 are selected by the user, and imaginary robot information corresponding to a point between the plurality of teaching instructions is displayed as an animation image. Therefore, the user is allowed to easily confirm the position and attitude of the manipulator 3 corresponding to a point between desired arbitrary teaching instructions in a moving image.

Note that as a method for selecting a plurality of teaching instructions, one user may select a plurality of teaching instructions or each of a plurality of users may select a specific teaching instruction. Moreover, when one teaching instruction is selected, teaching instructions before and after the teaching instruction or one of the teaching instructions may be automatically selected to select the plurality of teaching instructions.

Further, imaginary robot information in intervals specified by selected teaching instructions is displayed as a moving image (animation image) by the selection of a plurality of teaching instructions here. However, even when one teaching instruction (step) is selected, imaginary robot information may be displayed as an animation image on the basis of, for example, at least one of teaching instructions before and after the selected teaching instruction. Specifically, when the step [55] is, for example, selected by the user, imaginary robot information from the step [54] to the step [55] is displayed as an animation image, imaginary robot information from the step [55] to the step [56] is displayed as an animation image, or imaginary robot information from the step [54] to the step [56] is displayed as an animation image.

Moreover, when a plurality of teaching instructions are selected, an operating area as described using FIG. 5 may be provided for an interval (for example, a point between the teaching instructions) specified by the teaching instructions. For example, in accordance with a swipe operation by the user, imaginary robot information corresponding to a point between selected teaching instructions may be displayed while the point is moved. The input position recognition unit is only required to recognize an input position by the user in an operating area between selected teaching instructions, and the display unit 230 is only required to display imaginary robot information corresponding to the input position recognized by the input position recognition unit.

Robot Display Method

Next, a robot display method in which the robot teaching system 200 according to an embodiment of the present invention displays the position and attitude of a robot as imaginary robot information will be described in detail.

Figure 7:
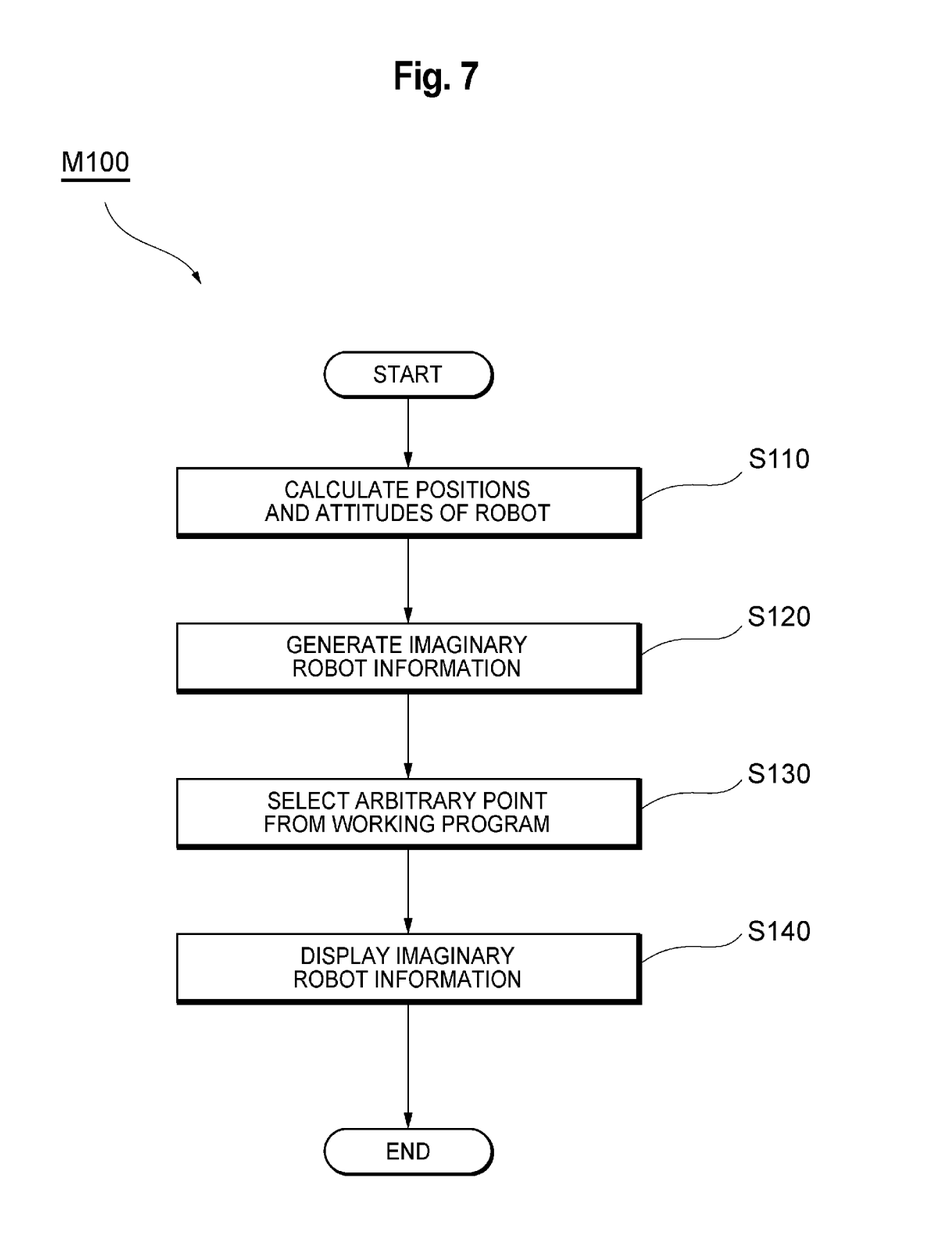
FIG. 7 is a flowchart showing the flow of the processing of a robot display method M100 performed by the robot teaching system 200 according to an embodiment of the present invention.

FIG. 7 is a flowchart showing the flow of the processing of a robot display method M100 performed by the robot teaching system 200 according to an embodiment of the present invention. As shown in FIG. 7, the robot display method M100 includes steps S110 to S140, and the respective steps are performed by a processor included in the robot teaching system 200.

In step S110, the robot teaching system 200 calculates the positions and attitudes of a robot corresponding to respective teaching instructions and points between the respective teaching instructions included in a working program for operating the robot (robot position and attitude calculation step). As a specific example, the robot position and attitude calculation unit 210 in the robot teaching system 200 calculates, on the basis of various information relating to teaching points or the like in respective teaching instructions and interpolation point information between the respective teaching instructions, the positions and rotation angles of the respective shafts of the manipulator 3 in consideration of the positions of the articulated arm 31 and the welding torch 32 of the manipulator 3.

In step S120, the robot teaching system 200 generates, on the basis of the positions and attitudes of the robot calculated in step S110, imaginary robot information corresponding to the respective teaching instructions and the points between the respective teaching instructions (imaginary robot information generation step). As a specific example, the imaginary robot information generation unit 220 in the robot teaching system 200 generates, on the basis of the positions and rotation angles of the respective shafts of the manipulator 3, respective imaginary robot information corresponding to respective teaching instructions and points between the respective teaching instructions using CG.

In step S130, the robot teaching system 200 selects at least one of the respective teaching instructions from the working program for operating the robot (teaching instruction selection step). As a specific example, the teaching instruction selection unit 240 in the robot teaching system 200 causes a user to select a teaching instruction or a prescribed point between teaching instructions from the working program.

In step S140, the robot teaching system 200 displays imaginary robot information corresponding to the teaching instruction selected in step S130 in a mode different from those of other imaginary robot information (imaginary robot information display step). As a specific example, the display unit 230 in the robot teaching system 200 displays only imaginary robot information corresponding to the teaching instruction selected in step S130, or highlights imaginary robot information corresponding to the teaching instruction selected in step S130 compared with other imaginary robot information. Here, the imaginary robot information corresponding to the selected teaching instruction is displayed as a still image or an animation.

As described above, in the robot teaching system 200 and the robot display method M100 according to an embodiment of the present invention, the robot position and attitude calculation unit 210 calculates the positions and attitudes of a robot corresponding to respective teaching positions and points between the respective teaching positions included in the working program PG10, and the imaginary robot information generation unit 220 generates imaginary robot information corresponding to the respective teaching instructions and the points between the respective teaching instructions on the basis of the positions and attitudes of the robot. Then, the display unit 230 displays the imaginary robot information VR10 corresponding to the teaching instruction PG11 selected by the teaching instruction selection unit 240, the imaginary robot information VR10d corresponding to a point between the teaching instruction PG11 and the teaching instruction PG11, and the animation image VR2 corresponding to a point between the teaching instruction PG11 and the teaching instruction PG12. Thus, the user is allowed to easily confirm the position and attitude of a robot corresponding to a desired arbitrary teaching instruction.

Note that imaginary robot information is displayed on a display screen using CG or the like in the present embodiment. However, imaginary robot information may be overlappingly displayed on an actual environment image that is an image including a workpiece to be welded and a robot. In this case, calibration between a robot in an actual environment and imaginary robot information may be performed using an AR marker or the like. Thus, the user is allowed to confirm the position and attitude of a robot in consideration of a workpiece or a workpiece board in the actual environment.

The embodiments described above intend to facilitate the understanding of the present invention and do not intend to interpret the present invention in a limited way. Respective elements and their arrangements, materials, conditions, shapes, sizes, or the like provided in the embodiments are not limited to exemplified ones but may be appropriately modified. Further, it is also possible to partially replace or combine constituting elements shown in the different embodiments together.

What is claimed is:

1. A robot teaching system comprising:
a robot controller comprising a processor and a storage unit, the storage unit storing a working program configured to operate an industrial robot;
a teaching system terminal in communication with the robot controller via a network, the teaching system terminal comprising:
a display; and
a teaching control unit comprising a second processor and a memory storing teaching instructions which, when executed, cause the second processor to:
access the working program stored in the storage unit;
generate a series of positions and attitudes of the industrial robot corresponding to respective teaching instructions included in the working program configured to operate the industrial robot;
generate displayable robot information corresponding to the respective teaching instructions, wherein the displayable robot information includes the generated positions and attitudes of the industrial robot;
simultaneously display, on the teaching system terminal display, the working program corresponding to respective teaching instructions as a series of steps and an animation of the displayable robot information corresponding to a selected series of displayed steps.

2. The robot teaching system according to claim 1, further comprising:
an input device disposed over the display that recognizes positions of user inputs; and
wherein the teaching instructions, when executed, further cause the processor to display the displayable robot information corresponding to the positions of the user inputs.

3. The robot teaching system according to claim 2 wherein the teaching instructions, when executed, further cause the processor to recognize the positions of user inputs corresponding to a displayed list of steps of the teaching program.

4. The robot teaching system according to claim 3, wherein the recognized positions of the user inputs correspond to a selected individual step of the teaching program.

5. The robot teaching system according to claim 4, wherein the teaching instructions, when executed, further cause the processor to display details of the selected individual step of the teaching program, and wherein the details of the selected individual step includes displayable robot information corresponding to one or more points between the selected individual step of the teaching program and a previous individual step of the teaching program.

6. The robot teaching system according to claim 4, wherein the teaching instructions, when executed, further cause the processor to display details of the selected individual step of the teaching program, and wherein the details of the selected individual step includes displayable robot information corresponding to one or more points between the selected individual step of the teaching program and a subsequent individual step of the teaching program.

7. The robot teaching system according to claim 3, wherein the recognized positions of the user inputs correspond to a selection of a plurality of individual steps of the teaching program.

8. The robot teaching system according to claim 7, wherein the teaching instructions, when executed, further cause the processor to display robot information including robot movement corresponding to the selection of the plurality of individual steps of the teaching program.

* * * * *